(12) United States Patent
Moiseyenko

(10) Patent No.: US 11,593,248 B2
(45) Date of Patent: Feb. 28, 2023

(54) FIRMWARE EVENT TRACKING SYSTEMS AND METHODS FOR PREVENTING LOSS OF EVENTS

(71) Applicant: SK hynix Inc., Gyeonggi-do (KR)

(72) Inventor: Denis Moiseyenko, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 308 days.

(21) Appl. No.: 16/815,739

(22) Filed: Mar. 11, 2020

(65) Prior Publication Data
US 2021/0286553 A1  Sep. 16, 2021

(51) Int. Cl.
| | | |
|---|---|---|
| G06F 11/00 | (2006.01) | |
| G06F 11/34 | (2006.01) | |
| G06F 3/06 | (2006.01) | |
| G06F 16/28 | (2019.01) | |
| G06F 11/14 | (2006.01) | |
| G06F 11/30 | (2006.01) | |

(52) U.S. Cl.
CPC .......... *G06F 11/3476* (2013.01); *G06F 3/064* (2013.01); *G06F 3/0604* (2013.01); *G06F 3/0659* (2013.01); *G06F 3/0673* (2013.01); *G06F 11/14* (2013.01); *G06F 11/30* (2013.01); *G06F 11/34* (2013.01); *G06F 11/3466* (2013.01); *G06F 16/285* (2019.01); *G06F 2201/86* (2013.01)

(58) Field of Classification Search
CPC .......... G06F 11/14; G06F 11/30; G06F 11/34; G06F 11/3466; G06F 11/3476
See application file for complete search history.

(56) References Cited

U.S. PATENT DOCUMENTS

| | | | | |
|---|---|---|---|---|
| 5,471,618 | A * | 11/1995 | Isfeld | G06F 13/26 |
| | | | | 710/39 |
| 8,578,393 | B1 * | 11/2013 | Fisher | G06F 11/3476 |
| | | | | 719/329 |
| 9,665,581 | B1 * | 5/2017 | Patel | G06F 16/13 |
| 2003/0066052 | A1 * | 4/2003 | McGeorge, Jr. | G06F 11/3476 |
| | | | | 717/124 |
| 2007/0186022 | A1 * | 8/2007 | Ren | G06F 13/24 |
| | | | | 710/260 |
| 2013/0007769 | A1 | 1/2013 | Alkov et al. | |
| 2018/0046556 | A1 * | 2/2018 | Marathe | G06F 11/1004 |
| 2018/0173577 | A1 * | 6/2018 | Stanfill | G06F 9/542 |
| 2018/0253434 | A1 * | 9/2018 | Johnson | G06Q 10/087 |
| 2019/0129774 | A1 | 5/2019 | Konan et al. | |
| 2019/0312825 | A1 * | 10/2019 | Newton | H04L 43/0888 |
| 2020/0012488 | A1 | 1/2020 | Koval et al. | |

\* cited by examiner

*Primary Examiner* — Joshua P Lottich
(74) *Attorney, Agent, or Firm* — IP & T Group LLP

(57) ABSTRACT

Systems, methods and instruction sets are provided for performing operations with respect to analyzing firmware. A firmware event tracker creates a tracker event log including event-items pertaining to events occurring during execution of the firmware; classifies each of the events as a first class event or a second class event; and stores the first and second class events in separate pools in a tracker storage.

18 Claims, 15 Drawing Sheets

FIRMWARE EVENT TRACKING SYSTEMS AND METHODS FOR PREVENTING LOSS OF EVENTS

BACKGROUND

1. Field

Embodiments of the present disclosure relate to a firmware event tracker for NAND-based storage devices, and methods of performing firmware event tracking for such devices.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSDs).

Data storage devices includes various components and failure analysis (FA) of the components is often required. For example, a firmware event tracker may be used for tracking and logging events occurring during execution of firmware and analyzing the logged events.

SUMMARY

Aspects of the present invention include firmware event tracking systems and method for tracking and logging events occurring during execution of firmware and analyzing the logged events, without loss of the logged events.

In one aspect, a system includes a memory device including a plurality of blocks and a controller including firmware. The controller creates a tracker event log including a plurality of event-items pertaining to events occurring during execution of the firmware; classifies each of the events as a first class event with a relatively high priority or a second class event with a relatively low priority, based on one or more event attributes; and stores the first class events in a first pool of blocks among the plurality of blocks and storing the second class events in a second pool of blocks among the plurality of blocks.

In another aspect, a method operates a system, which includes a memory device including a plurality of blocks and a controller including firmware. The method includes: creating a tracker event log including a plurality of event-items pertaining to events occurring during execution of the firmware; classifying each of the events as a first class event with a relatively high priority or a second class event with a relatively low priority, based on one or more event attributes; and storing the first class events in a first pool of blocks among the plurality of blocks and storing the second class events in a second pool of blocks among the plurality of blocks.

In still another aspect, a non-transitory computer-readable storage medium stores a set of instructions for directing a host device to perform failure analysis of firmware using a firmware event tracker stored in a NAND memory device and that includes multiple event-items pertaining to events that occurred during execution of firmware in a storage device. The set of instructions includes instructions for creating a tracker event log including a plurality of event-items pertaining to events occurring during execution of the firmware; classifying each of the events as a first class event with a relatively high priority or a second class event with a relatively low priority, based on one or more event attributes; and storing the first class events in a first pool of blocks among the plurality of blocks and storing the second class events in a second pool of blocks among the plurality of blocks.

Additional aspects of the present invention will become apparent from the following description.

DETAILED DESCRIPTION

Figure 1:
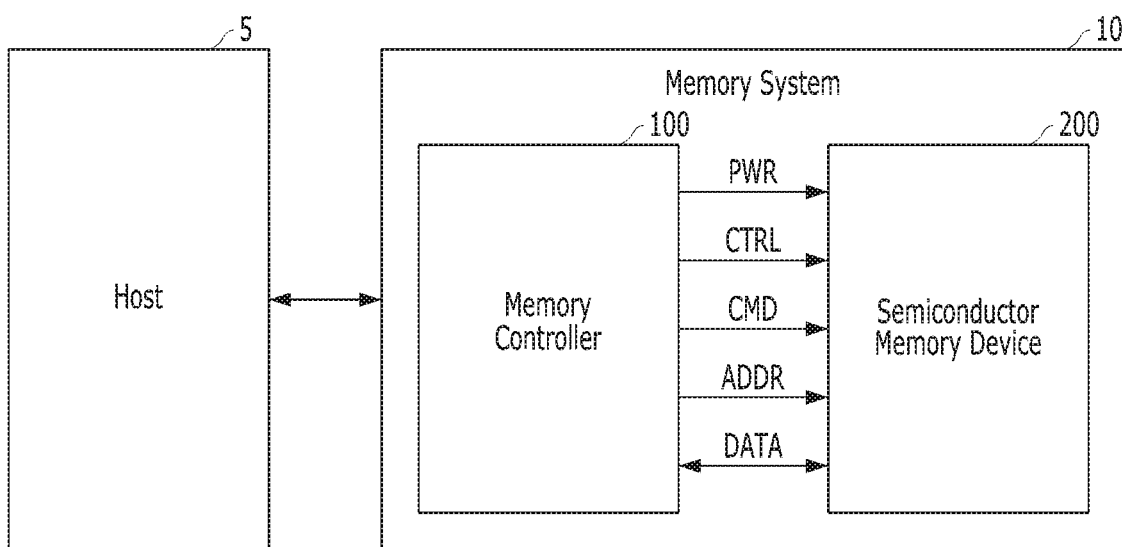
FIG. 1 is a block diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram schematically illustrating a memory system in accordance with an embodiment of the present invention.

Referring FIG. 1, the memory system 10 may include a memory controller 100 and a semiconductor memory device 200, which may represent more than one such device. The semiconductor memory device(s) 200 may be flash memory device(s), particularly of the NAND-type.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a powerline and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to form a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
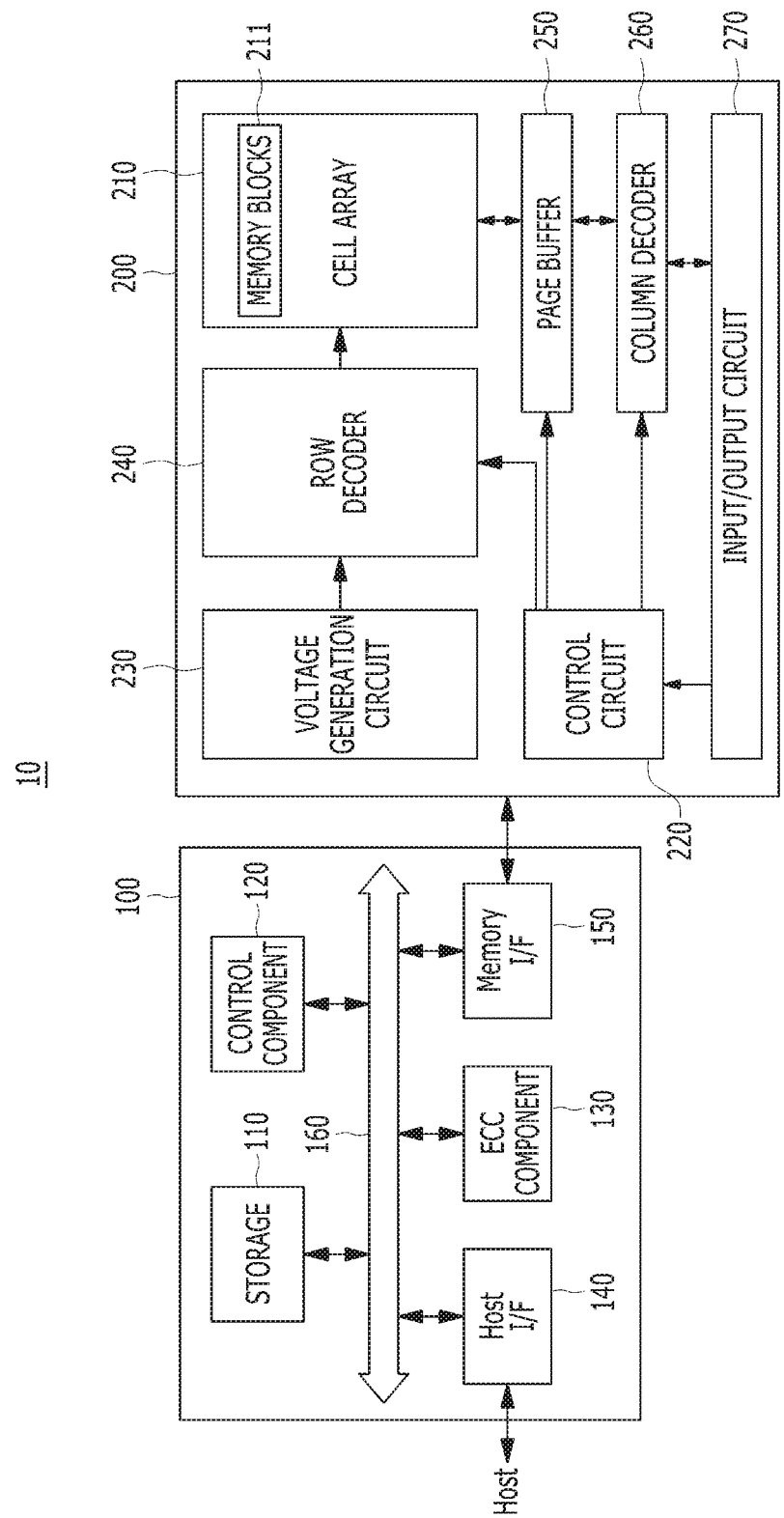
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In some embodiments, the ECC component 130 may perform an error correction operation based on a coded modulation such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). As such, the ECC component 130 may include all circuits, systems or devices for suitable error correction operation.

The host interface 140 may communicate with the host device through one or more of various interface protocols such as a universal serial bus (USB), a multi-media card (MMC), a peripheral component interconnect express (PCI-e), a small computer system interface (SCSI), a serial-attached SCSI (SAS), a serial advanced technology attachment (SATA), a parallel advanced technology attachment (PATA), an enhanced small disk interface (ESDI), an integrated drive electronics (IDE), and non-volatile memory express (NVMe).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
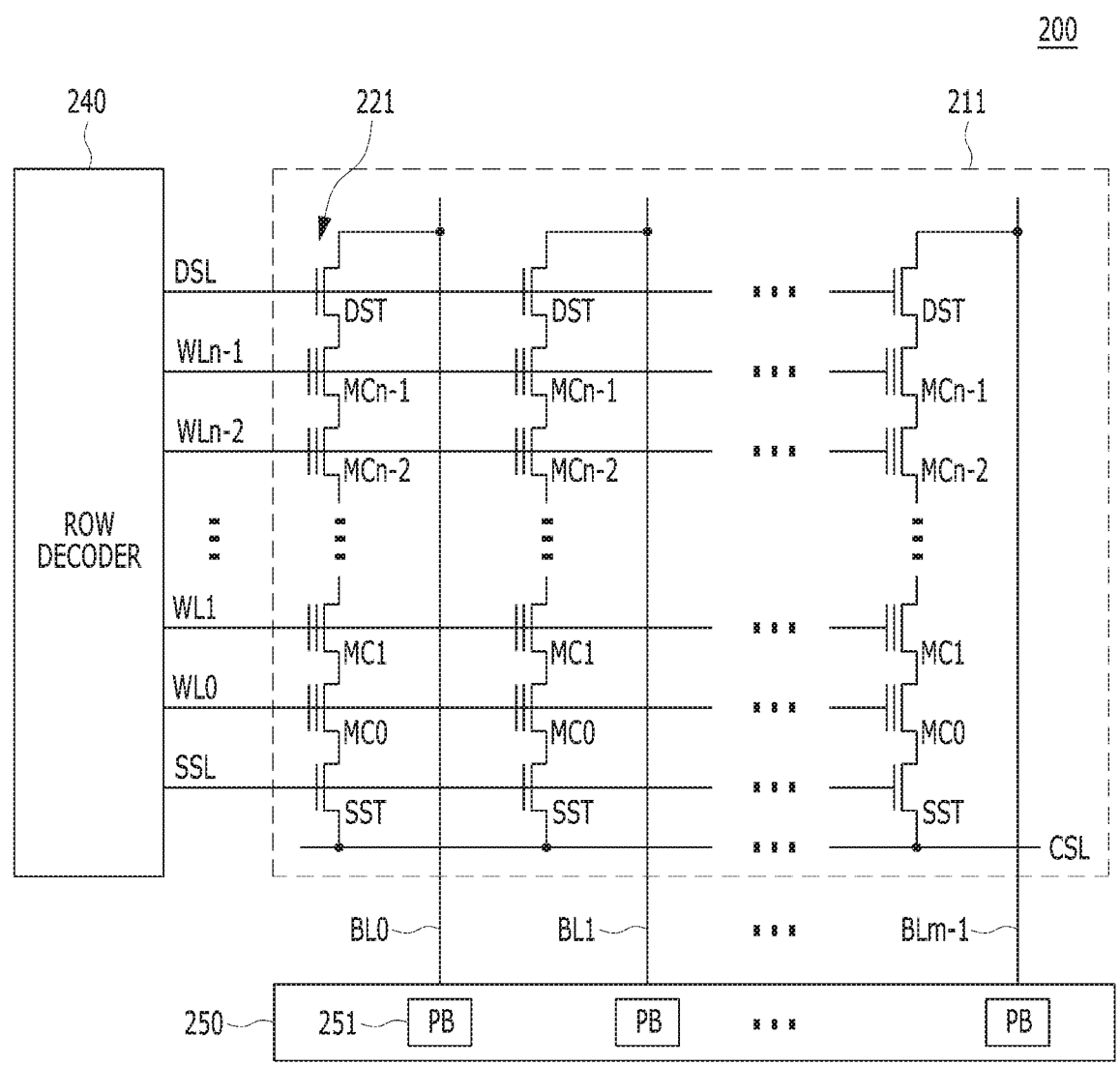
FIG. 3 is a circuit diagram illustrating a memory block of a memory device of a memory system in accordance with an embodiment of the present invention.

The page buffer 250 may be in electrical communication with the memory cell array 210 through bit lines BL (shown in FIG. 3). The page buffer 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit/receive data to/from the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 my temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Memory systems, e.g., NAND-based storage devices, are produced through a process. Such process includes a number of principal steps including component design (NAND, system-on-chip (SoC), firmware, board, etc.), component integration, product operation stabilization, preparation of engineering samples and customer samples, preparation of a release candidate, mass production, and return material authorization (RMA) support. Failure analysis (FA) of various components is also part of the process. One such component on which FA is performed is firmware.

Existing FA capabilities for firmware include Joint Test Action Group (JTAG) debuggers, universal asynchronous receiver-transmitter (UART) serial port output, and internal logging (statistical and flow types). While each of these techniques has advantages, each also has disadvantages. Firmware event trackers may be used to enhance FA of supplier and customer side issues. Firmware event trackers may track events, create a tracker event log, and use such log to evaluate, e.g., perform FA on, the firmware. One implementation of firmware event trackers has a structure as shown in FIGS. 4 to 8. Such a structure is described in U.S. Patent Application Publication No. 2019/0129774, entitled "FIRMWARE EVENT TRACKING FOR NAND-BASED STORAGE DEVICES, AND METHODS AND INSTRUCTION SETS FOR PERFORMING THE SAME" and incorporated by reference herein.

Figure 4:
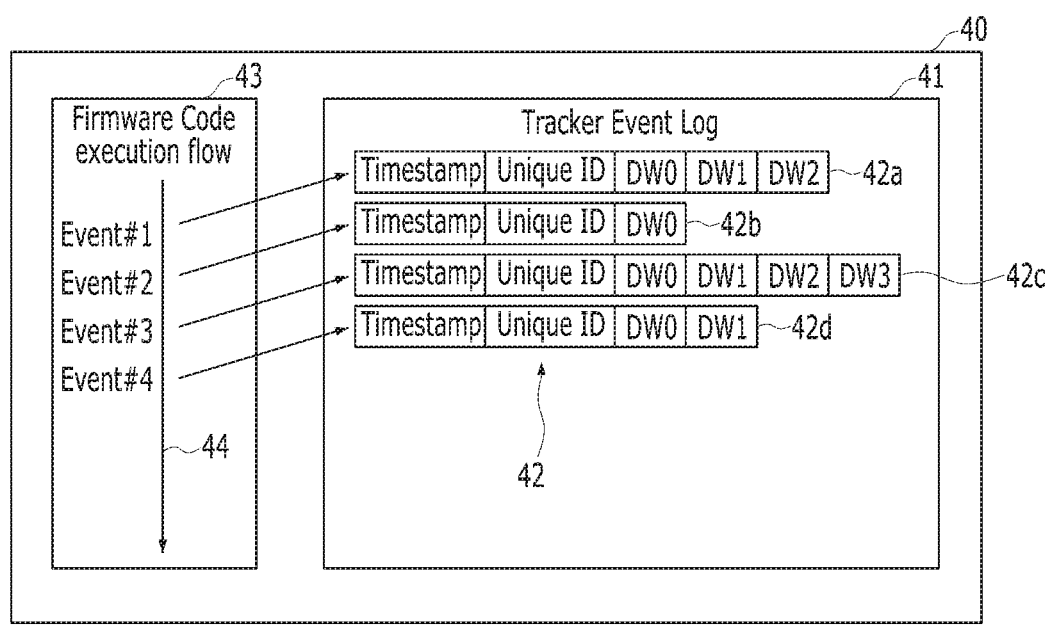
FIG. 4 is a schematic diagram showing a firmware event tracker for a memory device of a memory system in accordance with an embodiment of the present invention.

FIG. 4 is a schematic illustration of a firmware event tracker 40, showing creation of a tracker event log 41. The tracker event log 41 includes multiple event-items 42, for example, event-items 42a-42d. Each of the event-items 42a-42d is defined by a timestamp, a unique identifier (ID), and one to five custom parameters. A custom parameter may identify a specific channel, die, block, page, and/or column. Each of the custom parameters may be of a double word (DWORD) type. In the illustrated embodiment, event-item 42a has three custom parameters (DW0, DW1, DW2), event-item 42b has one custom parameter (DW0), event-item 42c has four custom parameters (DW0, DW1, DW2, DW3), and event-item 42d has two custom parameters (DW0, DW1).

The event-items 42 are generated from execution of the firmware. An exemplary firmware code execution flow 43 is illustrated with a timeline 44 of events respectively corresponding to the event-items 42. For example, Event #1, Event #2, Event #3 and Event #4 in the timeline 44 respectively correspond to event-items 42a, 42b, 42c and 42d.

Figure 5:
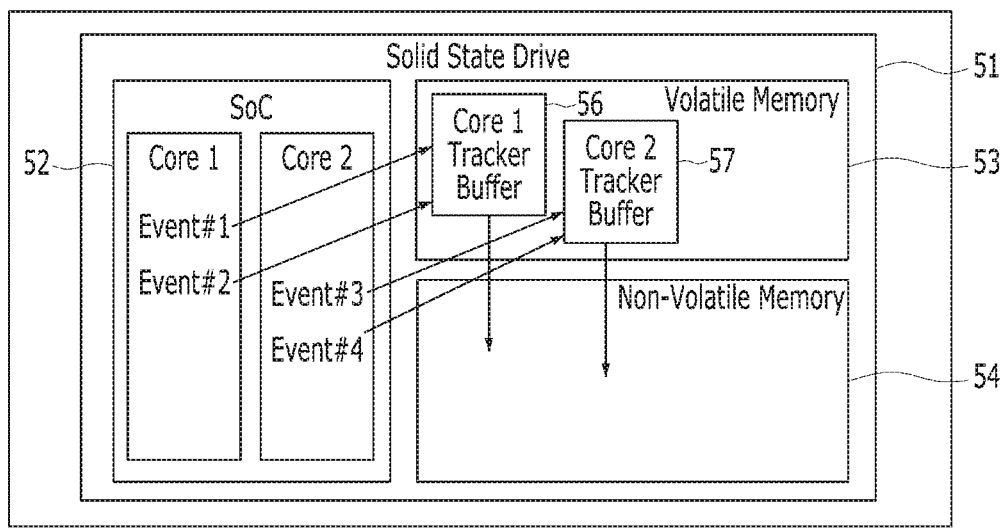
FIG. 5 is a schematic diagram showing an exemplary multi-core solid state drive (SSD) in connection with storage of tracked event-items in accordance with an embodiment of the present invention.

Referring to FIG. 5, an exemplary multi-core solid state drive (SSD) 51 is illustrated to show storage of tracker events. The SSD 51, which may be a NAND-based device, includes a system-on-chip (SoC) 52 with multiple cores, e.g., Core 1 and Core 2. Each of the events pertain to a specific one of the cores. In the illustrated embodiment, Event #1 and Event #2 (and their respective event-items 42a and 42b) pertain to Core 1, while Event #3 and Event #4 (and their respective event-items 42c and 42d) pertain to Core 2.

The SSD 51 further includes volatile memory 53 and non-volatile memory 54. The volatile memory 53 may be external or internal and may be implemented as a tightly-coupled memory (TCM), a dynamic random-access memory (DRAM) or static random-access memory (SRAM). The non-volatile memory 54, which may also be internal or external, may be a NAND-type flash memory. The volatile memory 53 includes a tracker buffer for each of the multiple cores. Thus, in the illustrated embodiment, volatile memory 53 includes Core 1 tracker buffer 56 and Core 2 tracker buffer 57.

To meet SSD performance and quality-of-service (QoS) requirements, event-items 42 representing tracked events are first stored in the volatile memory 53. Then, as the volatile memory 53 becomes full, the event-items 42 are flushed to the non-volatile memory 54.

In connection with this storage process, each event-item maintains association with the core to which it pertains. Thus, the event-items 42a and 42b for Events #1 and #2 respectively, each pertaining to Core 1, are initially stored in Core 1 tracker buffer 56, and event-items 42c and 42d for Events #3 and #4 respectively, each pertaining to Core 2, are initially stored in Core 2 tracker buffer 57. As the volatile memory 53 becomes full, the event-items 42 stored therein are flushed to the non-volatile memory 54.

Figure 6:
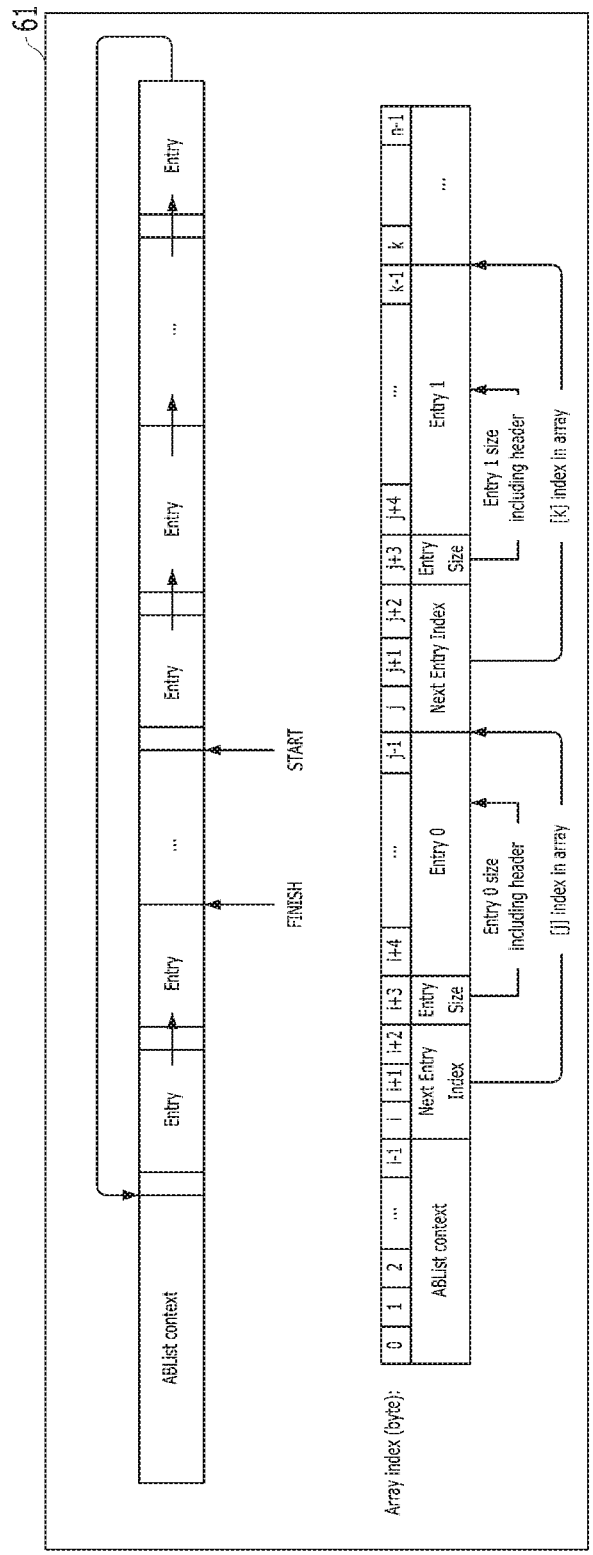
FIG. 6 shows an ABList data structure in accordance with an embodiment of the present invention.

Tracker event-items 42, with their custom format (timestamp, unique ID, and parameters), are stored initially in the volatile memory 53. To more efficiently utilize the buffers, event-items 42 are stored in the volatile memory 53 using an array based list (ABList) 61. The ABList data structure, which is shown in FIG. 6, is a unidirectional linked list in which each entry has a header with entry length and pointer to the next entry in the list. The entry length in the ABList entry header is needed because each of the tracker buffers is cyclic. The tracker system configuration allows for buffer overwrite in a cyclic manner, e.g., last in, first out (LIFO). However, to avoid loss of event-items 42, there is an option to forbid overwrite and flush the tracker buffers, as they become full, to non-volatile memory. The flush strategy or policy, which may be based on buffer fullness or by request, may be set up as part of the tracker system configuration. The stored event-items 42 are also flushed from volatile memory 53 to non-volatile memory 54 upon occurrence of a critical event such as power loss.

Figure 7:
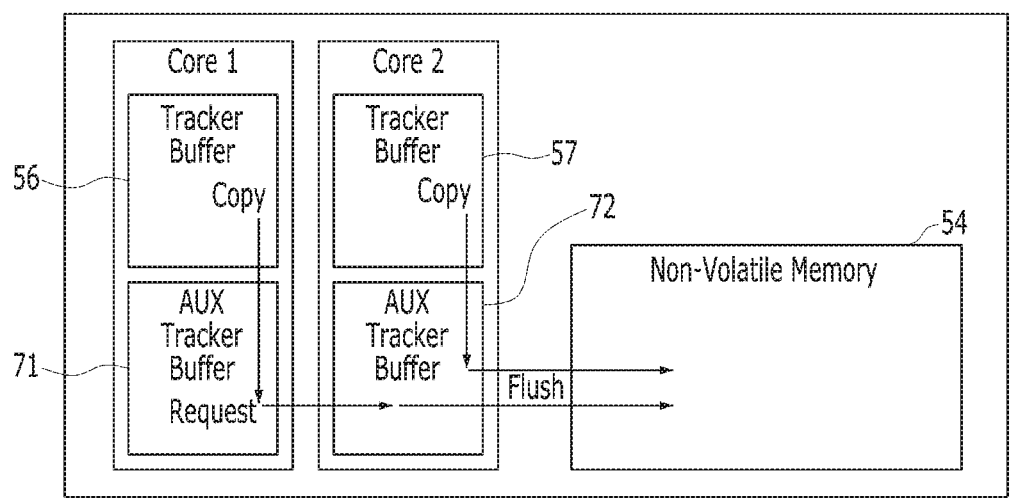
FIG. 7 is a schematic diagram showing flushing of event-items to non-volatile memory in accordance with an embodiment of the present invention.

While a tracker buffer 56, 57 is being flushed it should be intact, that is, preserved from new event-items being stored therein. To achieve this, while still allowing newly tracked events to be logged as event-items 42, auxiliary buffers are used. Referring to FIG. 7, there is an auxiliary tracker buffer 71 associated with the tracker buffer 56, which may be considered a main buffer, and an auxiliary tracker buffer 72 associated with the tracker buffer 57, which may be considered a main buffer. The main-aux buffer pair 56, 71 is associated with Core 1, and the main-aux buffer pair 57, 72 is associated with Core 2.

During the flush operation, event-items 42 stored in the main buffers 56, 57 are copied and the copies are transferred to the auxiliary buffers 71, 72 respectively. The auxiliary buffers 71, 72 are then flushed to non-volatile memory 54. Use of the auxiliary buffers 71, 72 allows continuous logging of event-items 42 while not interrupting the flush operation.

Some cores of an SSD SoC may not have direct access to the non-volatile memory 54, in which case a "mailbox" approach to a core with direct access is employed to store the content of the auxiliary buffer(s) of a core without direct access. Different cores inside an SSD have different usages and peripherals. For example, one core may be in charge of host interface operation, such as SATA or NVMe, and another core may be in charge of operation with the flash memory. In order to perform its duties, each core should have several functionality-specific hardware peripherals. In order to minimize SoC size, each peripheral is typically mapped to only one core. In the present embodiment, Core 1 may be for host operation, and Core 2 may be for NAND operation. In that case, Core 1 cannot by itself store data to NAND as it has no access to flash peripherals. Thus, Core 1 performs a mailbox request to Core 2 requesting Core 2 to store the buffer contents of Core 1 to the non-volatile memory 54, e.g., NAND.

An SSD device typically uses non-straightforward methods to store data in non-volatile memory, i.e., NAND, compared to a hard disk drive (HDD). The complexity comes from NAND specific operations, such as page-based programming and block-based erasing. An SSD saves meta information (system data) to maintain its operation. A portion of the system data is also stored in NAND. Typically, a unified approach is used to store system data in order to save code and NAND space. However, storing a tracker event log together with other system data has certain shortcomings. In the event that system storage breaks or becomes disabled (as bugs can occur anywhere in code), an appended tracker event log is not likely recoverable. Also, before using a tracker event log stored with other system data, initialization of storage is needed; thus such initialization process cannot be profiled with the tracker. Further, storing a tracker event log with other system data affects the general system area state, which should be minimized.

Figure 8:
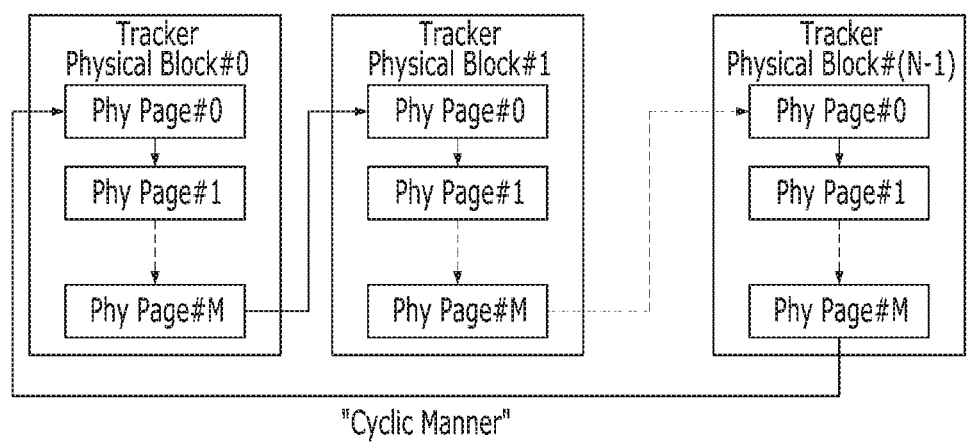
FIG. 8 is a schematic diagram showing cyclical storage of a tracker event log in a NAND memory device in accordance with an embodiment of the present invention.

In an implementation, the set of physical blocks of the non-volatile memory 54, i.e., NAND, is controlled for storage of the tracker event log 41. Compared to host data, the number of write operations to the NAND blocks is significantly less; thus, the write performance for large amounts of data is not a factor. As shown in FIG. 8, a relatively simple algorithm may be utilized to store the tracker event log 41 in the non-volatile memory 54, i.e., NAND, block-by-block, page-by-page. The non-volatile memory 54 as a tracker storage is used in a cyclic manner as shown in FIG. 8.

Figure 9:
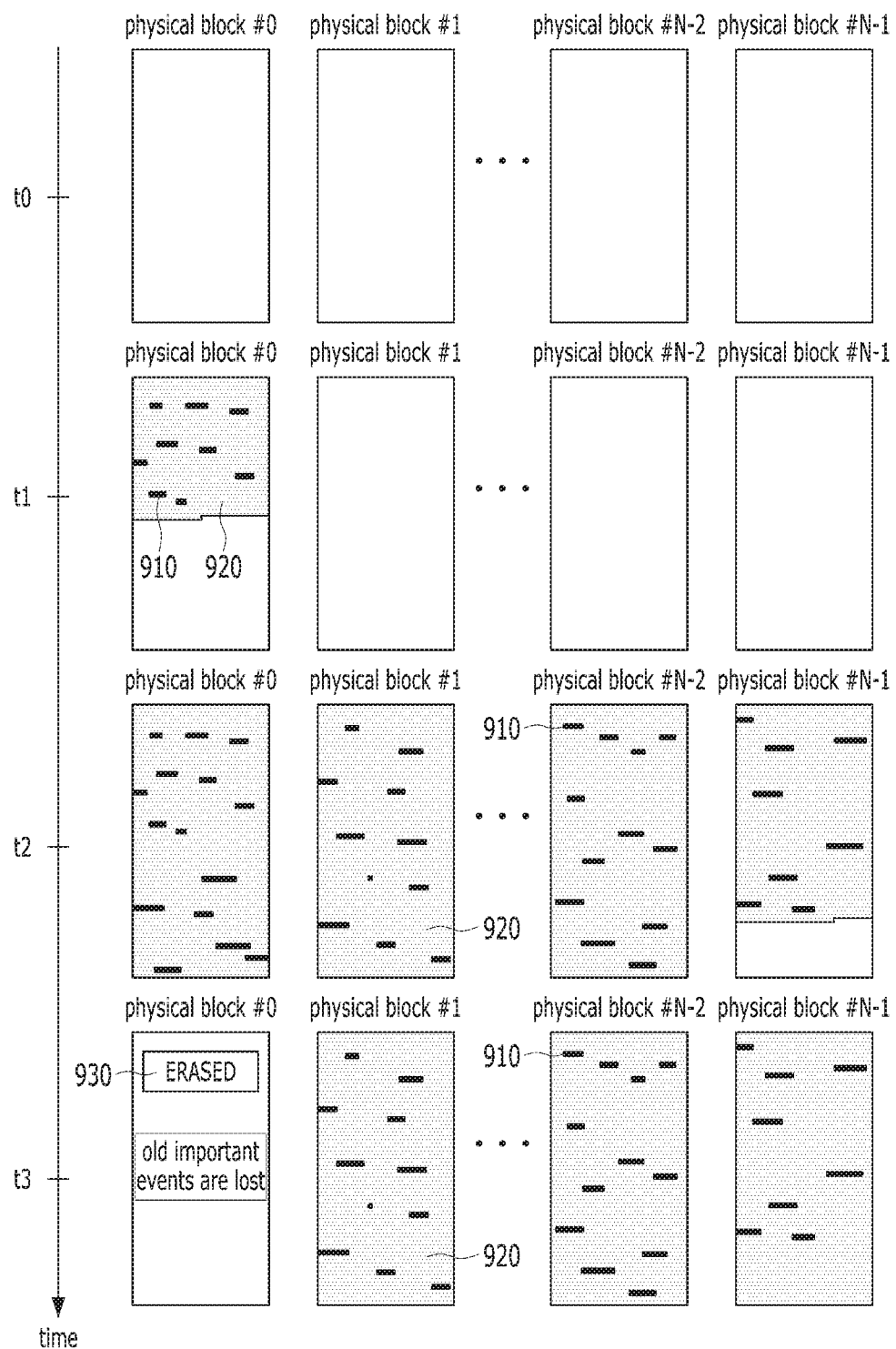
FIG. 9 shows a problematic scenario of cyclical storage of a tracker event log in FIG. 8.

As described above, in the implementation of the related Patent Application Publication No. 2019/0129774, the tracker storage (i.e., NAND physical block) is utilized in the cyclic manner and stores all event-items of the tracker event log 41 together. The present invention provides improvements. All event-items (or events) can be divided into two groups or classes: important ones and non-important ones. Important events happen relatively rarely but they are essential for failure analysis, whereas non-important events happen often and are informative. When all events are saved into the same tracker storage in the cyclic manner, older important events may be lost as a result of storage of non-important events, as shown in FIG. 9. Even when older important events are not lost, locating them among the relatively large number of non-important events may be difficult and/or time consuming.

Referring to FIG. 9, it is illustrated that there are N physical blocks used for storage a tracker event log. Important events 910 and other events 920 are cyclically stored in the physical blocks. At time t1, important events 910 and other (non-important or less important) events 920 are stored in a physical block #0. At time t2, important events 910 and other events 920 are stored in the physical block #0 to Nth physical block #(N−1). At time t3, the physical block #0 is erased for storage other events 920 (930). Thus, important events 910 stored in the physical block #0 are lost.

Figure 10:
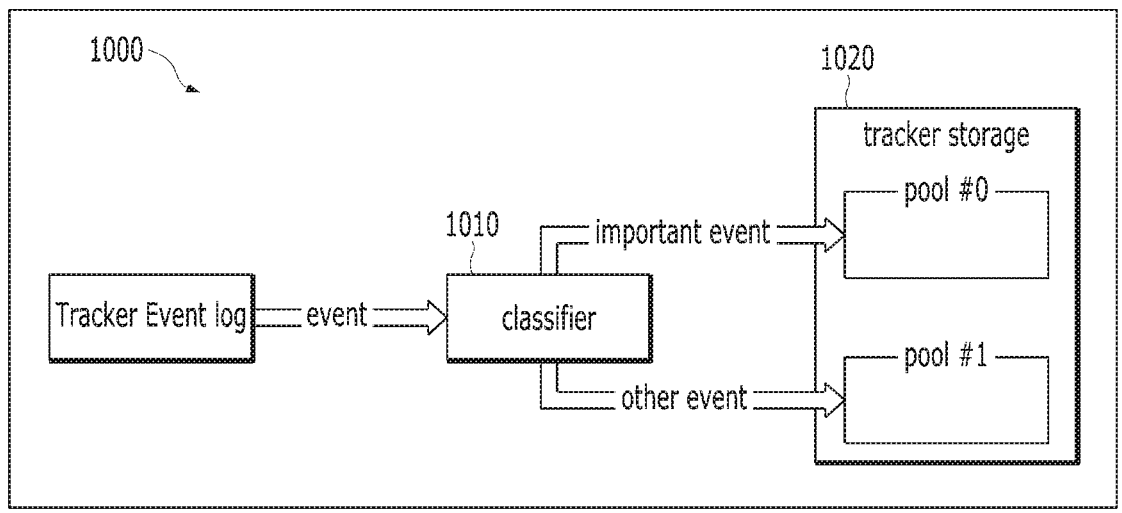
FIG. 10 is a schematic diagram showing a firmware event tracker with a classifier and a tracker storage in accordance with an embodiment of the present invention.

FIG. 10 is a schematic diagram showing a firmware event tracker 1000 in accordance with an embodiment of the present invention.

Referring to FIG. 10, the firmware event tracker 1000 may create a tracker event log. The tracker event log may include a plurality of event-items pertaining to events occurring during execution of firmware. Although event-items are different from events, since event-items respectively correspond to events, it is noted that event-items and events as described below have the same meaning.

In some embodiments, as shown in FIG. 4, each of the event-items includes a timestamp, a unique identifier and at least one parameter describing the corresponding event.

In some embodiments, in order to identify or compare different tracker event logs, a tracker event log may be defined by a usefulness value (U): $U=\Sigma_{i=1}^{K} U_i$, where K is the number of event classes. All tracker event-items (or events) in a tracker event log may be classified by some attributes. In some embodiments, attributes include parameter of importance (I) and/or parameter of occurrence speed (S). Parameter of importance (I) may depend on time, which is defined by a firmware developer. For example, older events are relatively less important whereas recent events are relatively high important. Parameter of occurrence speed (S) may represent the number of events per period. For example, when the number of events per period is high, a corresponding event are relatively less important. As a tracker event log includes more important events, its usefulness increases.

The firmware event tracker 1000 may include a classifier 1010 and a tracker storage 1020. The classifier 1010 may receive a tracker event log and classify tracker events of the tracker event log based on event attributes. In some embodiments, the classifier 1010 classifies tracker events into two classes: first class events, each with a relatively high priority, and second class events, each with a relatively low priority.

For example, the first class events are defined as important events, whereas the second class events are defined as other events (or non-important events). In alternative embodiment, the classifier 1010 classifies tracker events into more than two classes, e.g., first class events, second class events, third class events, etc. in order of priority.

Figure 11:
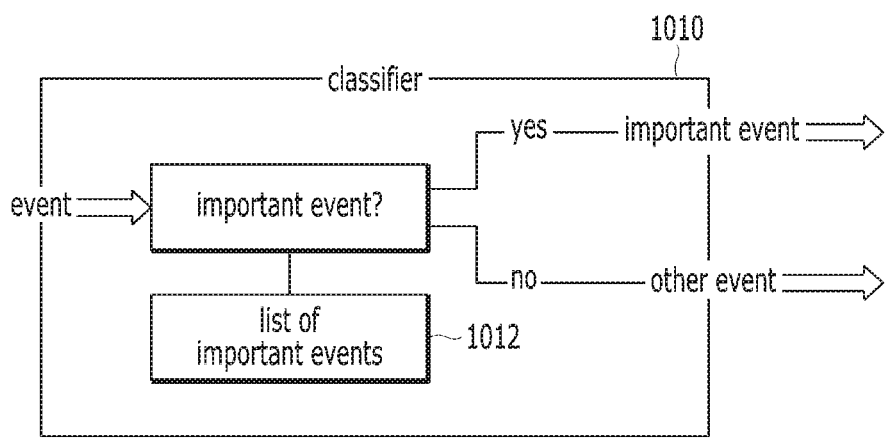
FIG. 11 is a schematic diagram showing an operation of a classifier in accordance with an embodiment of the present invention.

FIG. 11 is a schematic diagram showing an operation of the classifier 1010 in accordance with an embodiment of the present invention.

Referring to FIG. 11, the classifier 1010 may receive each of plural tracker events and determine whether or not each received event is an important event. In some embodiments, the classifier 1010 determines whether or not the received event is an important event, based on a list 1012. The list 1012 may store information regarding important events, i.e., identifiers regarding important events. When the received event is identified as being in the list 1012, the classifier 1010 classifies that the received event as an important event. When the received event is not found in the list 1012, the classifier 1010 classifies that the received event as other event (i.e., non-important or less important event).

Referring back to FIG. 10, the tracker storage 1020 may include a plurality of blocks, e.g., NAND physical blocks. In some embodiments, the number of physical blocks in each pool may be determined based on a block budget or constraint and/or lifespan of a storage device (e.g., SSD). A block budget may be determined by the configuration of the storage device and user capacity. Among a plurality of super blocks, one super block is allocated for the tracker storage 1020. In some embodiments, the plurality of blocks in one super block includes two pools: a first pool #0 for first class events (i.e., important events) and a second pool #1 for second class events (i.e., other non-important or less important events). The number of blocks in the first pool may be less than the number of blocks in the second pool. For example, blocks may be allocated to the first and second pools in a ratio of 1:3. With that allocation, when a super block includes 16 physical blocks, the first pool may include 4 physical blocks and the second pool may include 12 physical blocks. In alternative embodiment, there may be more than two pools, e.g., (M+1) pools, as shown in FIG. 12, where M is an integer of 2 or more.

Figure 12:
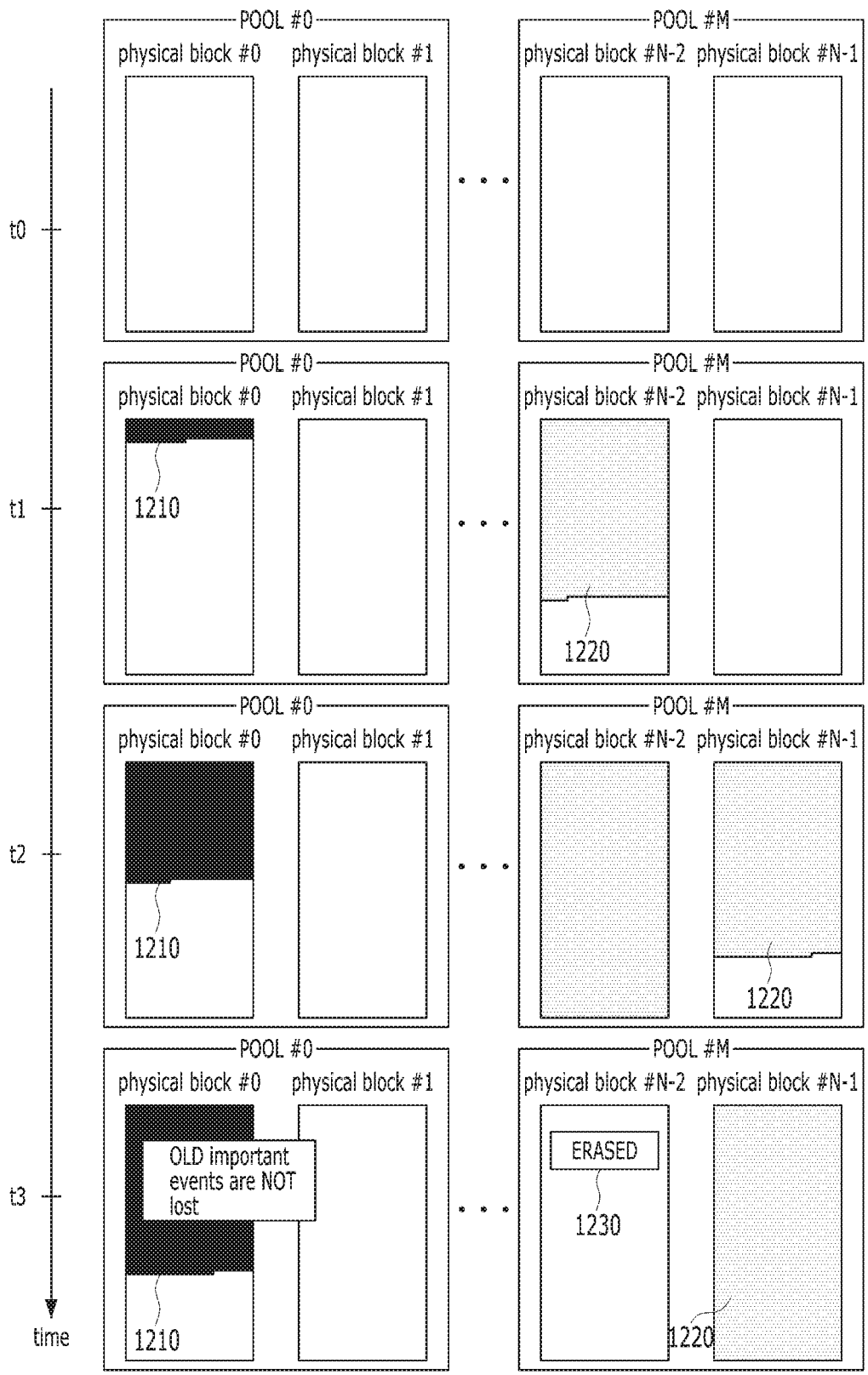
FIG. 12 is a schematic diagram showing a tracker storage in accordance with an embodiment of the present invention.

Referring to FIG. 12, the tracker storage 1020 may include (M+1) pools, each including a plurality of blocks. In some embodiments, as shown, the tracker storage 1020 includes a first pool #0 to a (M+1)th pool #M. Each pool may include a subset of all of the NAND physical blocks. For example, the first pool #0 includes a first physical block #0 and a second physical block #1, and the (M+1)th pool #M includes a (N−1)th physical block #(N−2) and a Nth physical block #(N−1). Those skilled in the art will understand that alternative structures and arrangements may be implemented.

At time t1, important events 1210 are partially stored in a physical block #0 of the pool #0 and other events 1220 are partially stored in a physical block #(N−2) of the pool #M. At time t2, important events 1210 are partially stored in the physical block #0 of the pool #0 and other events 1220 are cyclically stored in physical blocks #(N−2) and #(N−1) of the pool #M. In other words, other events 1220 are fully stored in the physical block #(N−2) and then are partially stored in the physical block #(N−1) of the pool #M. At time t3, important events 1210 are partially stored in the physical block #0 of the pool #0 and other events 1220 are fully stored in the physical block #(N−1) of the pool #M. For more storage of other events 1220, the physical block #(N−2) is erased (1230). Thus, important events 910 stored in the physical block #0 are not lost.

Figure 13:
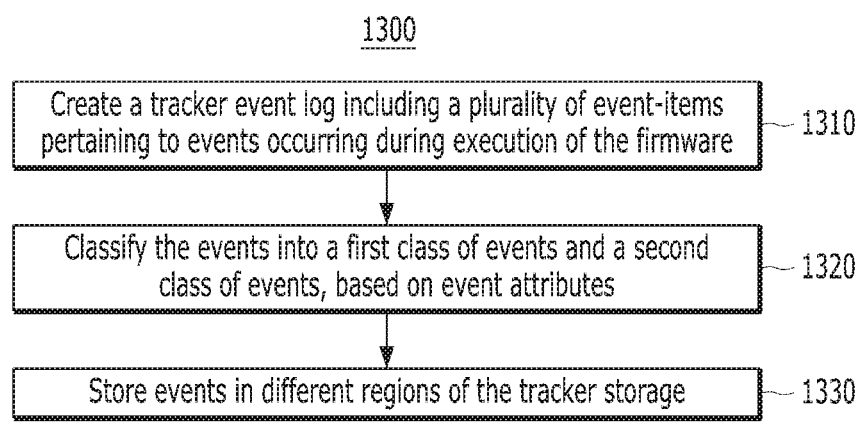
FIG. 13 is a flowchart showing an operation of a firmware event tracker in accordance with embodiments of the present invention.

FIG. 13 is a flowchart showing an operation 1300 of the firmware event tracker 1000 in accordance with embodiments of the present invention. The steps shown in the flow chart are exemplary. Those skilled in the art will understand that additional or alternative steps may be performed, or that the order of the steps may be changed, in order to effectuate aspects of the present invention without departing from the inventive concepts disclosed herein. The steps of flow charts may be performed by any suitable component(s) in accordance with the teachings herein.

Referring to FIG. 13, the operation 1300 may include steps 1310 to 1330. The operation 1300 may be performed by the firmware event tracker 1000 in FIGS. 10 and 11. At step 1310, the firmware event tracker 1000 may create a tracker event log including a plurality of event-items pertaining to events occurring during execution of the firmware.

At step 1320, the firmware event tracker 1000 may classify the events into first class events and second class events, based on event attributes. The event attributes indicate importance of the events. First class events include events with a relatively high priority. Second class events include events with a relatively low priority. In some embodiments, first class events include events related to error status and/or power of a storage device (or a memory system). For example, the error status includes statuses associated with a hardware that firmware can detect via a hardware register, such as an acceleration hardware (e.g., MUE, DMA), memory subsystem, timers (e.g., watchdog timeout), power module (e.g., defective capacitors, low external power supply), sensors (e.g., temperature sensors) and failure of NAND operations (e.g., program, read or erase errors). For another example, the event related to power includes events associated with defective capacitors or low external power supply. In some embodiments, the firmware event tracker 1000 generates a list including identifiers regarding the first class events and classifies each of the events based on the identifiers in the list. The list may be just a plain array with hardcoded event identifiers.

At step 1330, the firmware event tracker 1000 may separately store events in different regions of the tracker storage 1020. The tracker storage 1020 may be implemented with a plurality of blocks in a super block among multiple super blocks. The tracker storage 1020 may be set to include a first pool and a second pool. The first pool may store the first class events. The second pool may store the second class events.

Figure 14:
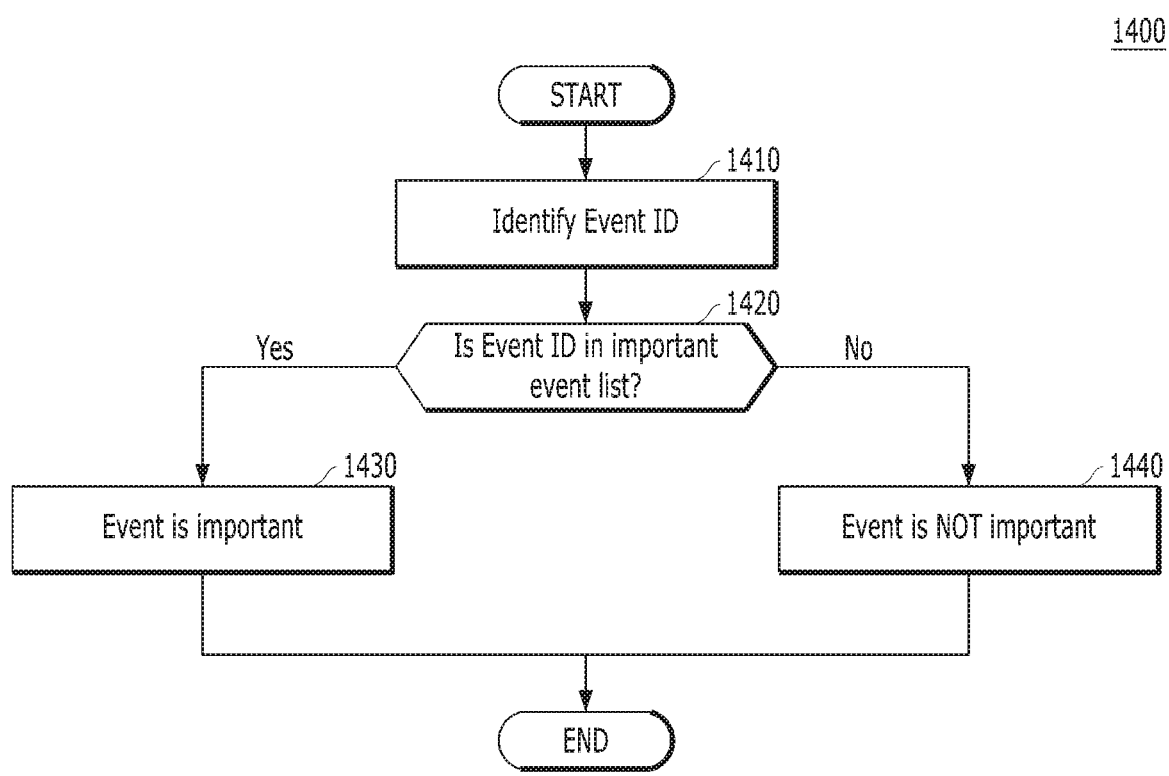
FIGS. 14 and 15 are flowcharts showing examples of an operation of a classifier, in accordance with embodiments of the present invention.
Figure 15:
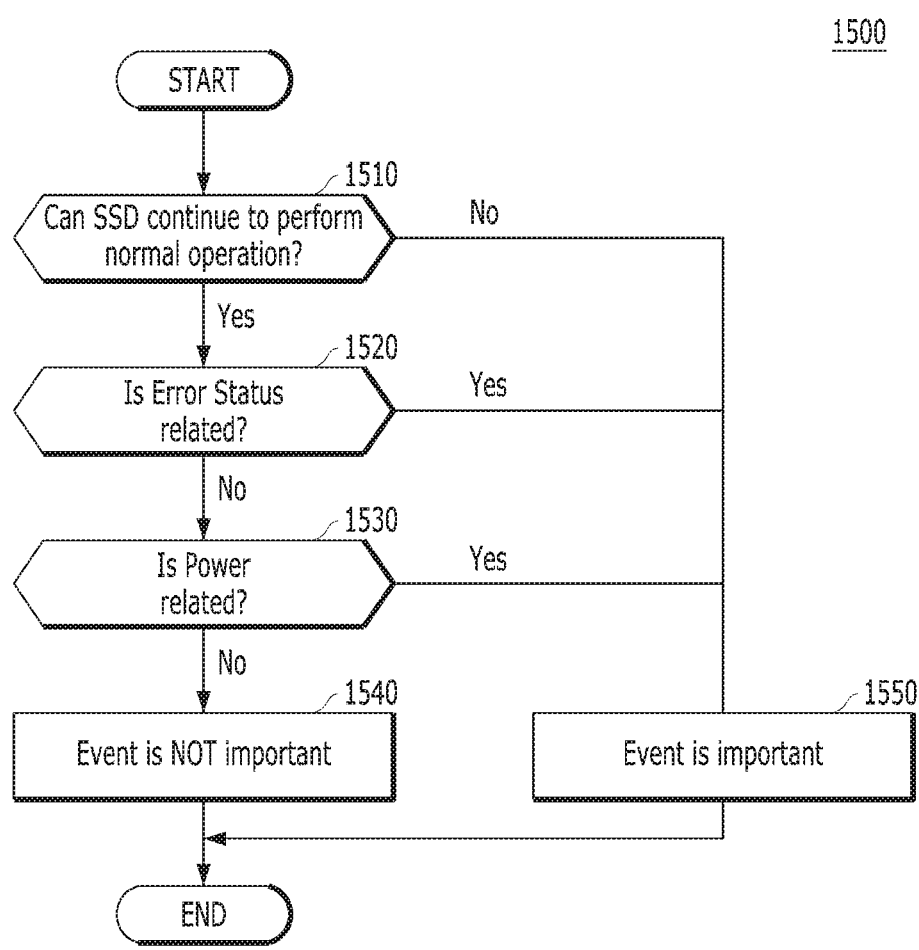

FIGS. 14 and 15 are flowcharts showing examples of an operation of the classifier 1010, in accordance with embodiments of the present invention.

Referring to FIG. 14, the operation 1400 may include steps 1410 to 1440. At step 1410, the classifier 1010 may receive an associated event and identify an identifier (ID) of the associated event, i.e., the event ID. At step 1420, the classifier 1010 may determine whether or not the event ID indicates that the associated event is important, which may be done by reference to a list of event IDs or other indicia representing events deemed to be important, e.g., the list 1012 of FIG. 11. When it is determined that the event ID is in the important event list (1420, Yes), at step 1430, the classifier 1010 may determine that the event is important and thus classify the event as an important event. When it is determined that the event ID is not in the important event list (1420, No), at step 1440, the classifier 1010 may determine that the event is not important and thus classify the event as a non-important event.

Referring to FIG. 15, the operation 1500 may include steps 1510 to 1550. At step 1510, the classifier 1010 may determine whether a storage device (or a memory system), e.g., SSD, can continue to perform a normal operation, which may be any operation the storage device (or memory system) typically performs, such as a write or read operation. When it is determined that the SSD can continue to perform a normal operation (1510, Yes), the classifier 1010 may proceed to step 1520. Otherwise, the classifier 1010 may proceed to step 1550. At step 1520, the classifier 1010 may determine whether an event associated with an event tracker (or event ID) received is related to an error status of the SSD. For example, the event related to error status includes statuses associated with a hardware, such as an acceleration hardware (e.g., MUE, DMA), memory subsystem, timers (e.g., watchdog timeout), power module (e.g., defective capacitors, low external power supply), sensors (e.g., temperature sensors) and failure of NAND operations (e.g., program, read or erase errors). When it is determined that the event is related to an error status of the SSD (1520, Yes), the classifier 1010 may proceed to step 1530. Otherwise, the classifier 1010 may proceed to step 1550. At step 1530, the classifier 1010 may determine whether the event is related to power of the SSD. For example, the event related to power includes events associated with defective capacitors or low external power supply. When it is determined that the event is related with power of the SSD (1530, No), the classifier 1010 may proceed to step 1540. Otherwise, the classifier 1010 may proceed to step 1550.

At step 1540, the classifier 1010 may determine that the event is not important and thus classify the event as a non-important event. At step 1550, the classifier 1010 may determine that the event is important and classify the event as an important event.

As FIG. 15 indicates, as each tracker event (or event ID) is received, various checks are performed to determine whether or not the associated event is important.

As the foregoing describes, embodiments of the present invention provide a firmware event tracker, which classify tracker events (representations of events) and the classified tracker events in separate tracker storage pools, one for each event classification. Since representations of new relatively low priority events are stored separately from representations of higher priority events, e.g., in separate pools of blocks, old events with a relatively high priority (i.e., important events) may be not lost.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. A system comprising:
a memory device including a plurality of blocks; and
a controller including firmware, configured for:
creating in the memory device a tracker event log including a plurality of event-items pertaining to events occurring during execution of the firmware;
classifying in an event classifier in the memory device the events in the tracker event log as first class events or second class events based on one or more event attributes, wherein the first class events a) have a higher priority than the second class events and b) relate to a characteristic detected by the firmware of the memory device; and
storing the first class events in a first pool of blocks among the plurality of blocks and storing the second class events separately from the first class events in a second pool of blocks among the plurality of blocks,
wherein the controller allocates the plurality of blocks in a super block among multiple super blocks for storage of the tracker event log, and
wherein the controller is configured to erase the second pool of memory blocks when more storage is needed to store new second class events, and thereby important events in the first pool of memory blocks are not lost.

2. The system of claim 1, wherein the event attributes indicate importance of the events.

3. The system of claim 2, wherein the first class events include events related to at least one of error status and power of the system.

4. The system of claim 2, wherein the controller generates a list including identifiers regarding the first class events.

5. The system of claim 4, wherein the controller classifies each of the events based on the identifiers of the list.

6. The system of claim 1, wherein the first pool of blocks includes a first number of blocks and the second pool of blocks includes a second number of blocks greater than the first number of blocks.

7. The system of claim 6, wherein the first number of blocks and the second number of blocks are allocated in a ratio of 1:3.

8. A method for operating a system, which includes a memory device including a plurality of blocks and a controller including firmware, the method comprising:
creating in the memory device a tracker event log including a plurality of event-items pertaining to events occurring during execution of the firmware;
classifying in an event classifier in the memory device the plurality of events in the tracker event log as a first class events or second class events based on one or more event attributes, wherein the first class events a) have a higher priority than the second class events and b) relate to a characteristic detected by the firmware of the memory device;
storing the first class events in a first pool of blocks among the plurality of blocks and storing the second class events separately from the first class events in a second pool of blocks among the plurality of blocks; and
allocating the plurality of blocks in a super block among multiple super blocks for storage of the tracker event log,
wherein the controller is configured to erase the second pool of memory blocks when more storage is needed to store new second class events, and thereby important events in the first pool of memory blocks are not lost.

9. The method of claim 8, wherein the event attributes indicate importance of the events.

10. The method of claim 9, wherein the first class events include events related to at least one of error status and power of the system.

11. The method of claim 9, further comprising:
generating a list including identifiers regarding the first class events.

12. The method of claim 11, wherein the classifying of the events includes classifying each of the events based on the identifiers of the list.

13. The method of claim 8, wherein the first pool of blocks includes a first number of blocks and the second pool of blocks includes a second number of blocks greater than the first number of blocks.

14. The method of claim 13, wherein the first number of blocks and the second number of blocks are allocated in a ratio of 1:3.

15. A non-transitory computer-readable storage medium storing a set of instructions for directing a memory device to perform operations for tracking events with respect to firmware, the set of instructions comprising instructions for:

creating in the memory device a tracker event log including a plurality of event-items pertaining to events occurring during execution of the firmware;

classifying in an event classifier in the memory device each of the plurality of events in the tracker event log into a first class events or second class events based on one or more event attributes, wherein the first class events a) have a higher priority than the second class events and b) relate to a characteristic detected by the firmware of the memory device;

storing the first class events in a first pool of blocks among the plurality of blocks and storing the second class events separately from the first class events in a second pool of blocks among the plurality of blocks; and allocating the plurality of blocks in a super block among multiple super blocks for storage of the tracker event log, wherein the controller is configured to erase the second pool of memory blocks when more storage is needed to store new second class events, and thereby important events in the first pool of memory blocks are not lost.

16. The non-transitory computer-readable storage medium of claim 15, wherein the event attributes indicate importance of the events.

17. The non-transitory computer-readable storage medium of claim 16, wherein the first class events include events related to at least one of error status and power of the system.

18. The non-transitory computer-readable storage medium of claim 16, wherein the set of instructions further comprises instructions for: generating a list including identifiers regarding the first class events.

\* \* \* \* \*